(12) United States Patent
Inagaki

(10) Patent No.: US 6,426,825 B1
(45) Date of Patent: Jul. 30, 2002

(54) SCANNING OPTICAL SYSTEM AND LASER SCANNING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/608,107

(22) Filed: Jun. 30, 2000

(30) Foreign Application Priority Data

Jul. 1, 1999 (JP) .............................................. 11-187194

(51) Int. Cl.⁷ ............................................... G02B 26/08
(52) U.S. Cl. ........................ 359/208; 359/207; 359/216
(58) Field of Search ................................ 359/207–208, 359/216–219

(56) References Cited

U.S. PATENT DOCUMENTS

| 5,093,745 | A | 3/1992 | Kuroda |
| 5,220,449 | A | 6/1993 | Kuroda |
| 5,353,047 | A | 10/1994 | Nakamura et al. |
| 5,583,559 | A | 12/1996 | Nakamura et al. |
| 5,648,865 | A | 7/1997 | Iizuka |
| 5,748,354 | A | 5/1998 | Iizuka |
| 5,751,464 | A | 5/1998 | Yoshikawa et al. |
| 5,801,869 | A | 9/1998 | Yoshikawa et al. |
| 5,812,298 | A | 9/1998 | Ono |
| 5,973,813 | A | 10/1999 | Takeuchi |
| 5,982,524 | A | 11/1999 | Fujimoto et al. |
| 6,091,533 | A | 7/2000 | Iizuka |
| 6,320,690 | B1 * | 11/2001 | Inagaki ....................... 359/208 |

FOREIGN PATENT DOCUMENTS

JP  8-220440  2/1995

* cited by examiner

Primary Examiner—James Phan
(74) Attorney, Agent, or Firm—Burns, Doane, Swecker & Mathis, LLP

(57) ABSTRACT

A scanning optical system that images a laser beam on a surface to be scanned, said laser beam being emitted from a light source and deflected by a deflector in order to scan the surface to be scanned, said scanning optical system, has a first optical functional surface being a reflecting surface having a "twisted" configuration; and a second optical functional surface having a "twisted" configuration different from the "twisted" configuration of the first optical functional surface.

14 Claims, 11 Drawing Sheets

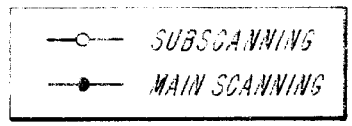
Fig. 7(a)
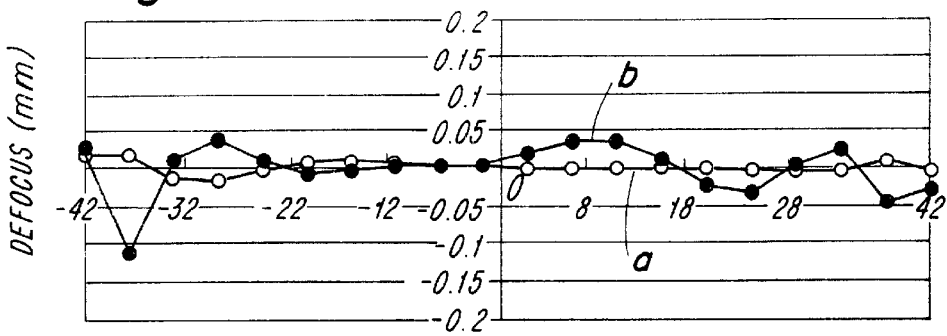
Fig. 7(b)
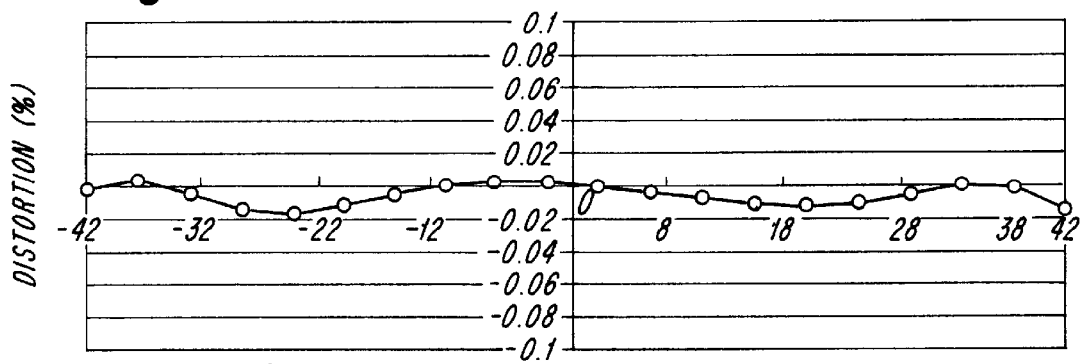
Fig. 7(c)
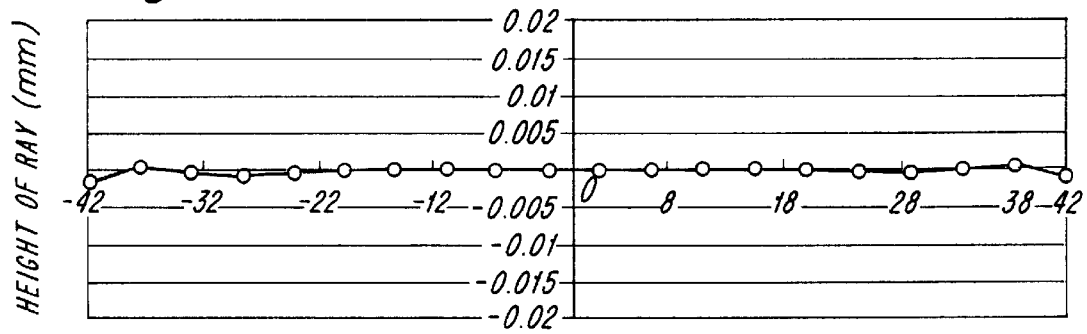
Fig. 7(d)
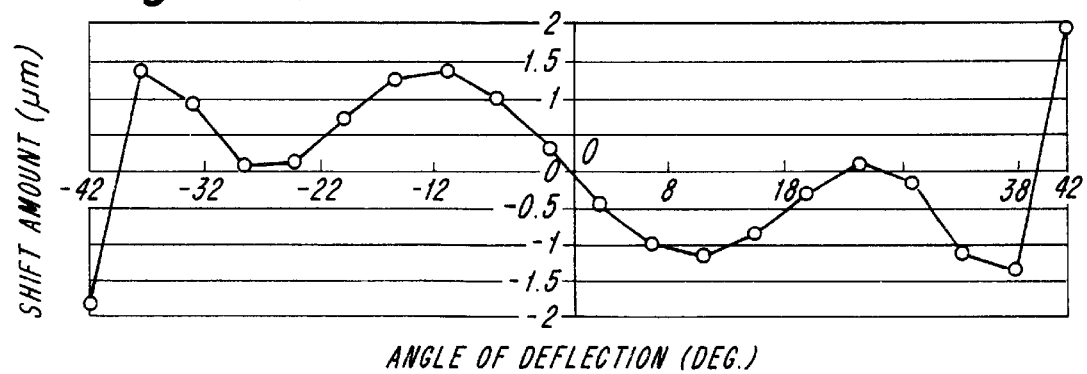
ANGLE OF DEFLECTION (DEG.)

SCANNING OPTICAL SYSTEM AND LASER SCANNING APPARATUS

RELATED APPLICATION

This application is based on application No. 11-187194 filed in Japan, the content of which is hereby incorporated by reference.

1. Field of the Invention

The present invention relates to a scanning optical system and a laser scanning apparatus using the scanning optical system, and more particularly, to a laser scanning apparatus suitable for use as a writing optical apparatus such as a laser beam printer.

2. Description of the Prior Art

Conventionally, in the field of scanning optical systems, a technology has been proposed to form a laser scanning optical system for scanning a surface at a substantially constant speed by use of a so-called toroidal mirror. An example is described in U.S. Pat. No. 5,353,047. Moreover, a technology has been proposed to form a scanning optical system that realizes high resolution although being small in size and low in cost by use of two rotationally symmetrical mirrors, for example, as described in Japanese Laid-open Patent Application No 08-220440.

However, in the above-described structures of the conventional scanning optical systems, only movement and rotation of the rotationally symmetrical surfaces are provided as the degree of freedom for absorbing the asymmetry in the sub scanning direction associated with optical path separation, and it is difficult to simultaneously resolve the problems of so-called bow and out-of-shape beam due to the asymmetry in the sub scanning direction.

SUMMARY OF THE INVENTION

An object of the present invention is to provide an improved scanning optical system.

Another object of the present invention is to provide a scanning optical system having better imaging performance although using a mirror.

The above-mentioned objects are achieved by a scanning optical system comprising: a first optical functional surface being a reflecting surface having a "twisted" configuration; and a second optical functional surface having a "twisted" configuration different from the "twisted" configuration of the first optical functional surface.

BRIEF DESCRIPTION OF THE DRAWINGS

These and other objects and features of this invention will become clear from the following description, taken in conjunction with the preferred embodiments with reference to the accompanied drawings in which:

FIGS. 7($a$) to 7($d$) are views showing performances of the scanning optical system according to the third embodiment.

DESCRIPTION OF THE PREFERRED EMBODIMENTS

Figure 1:
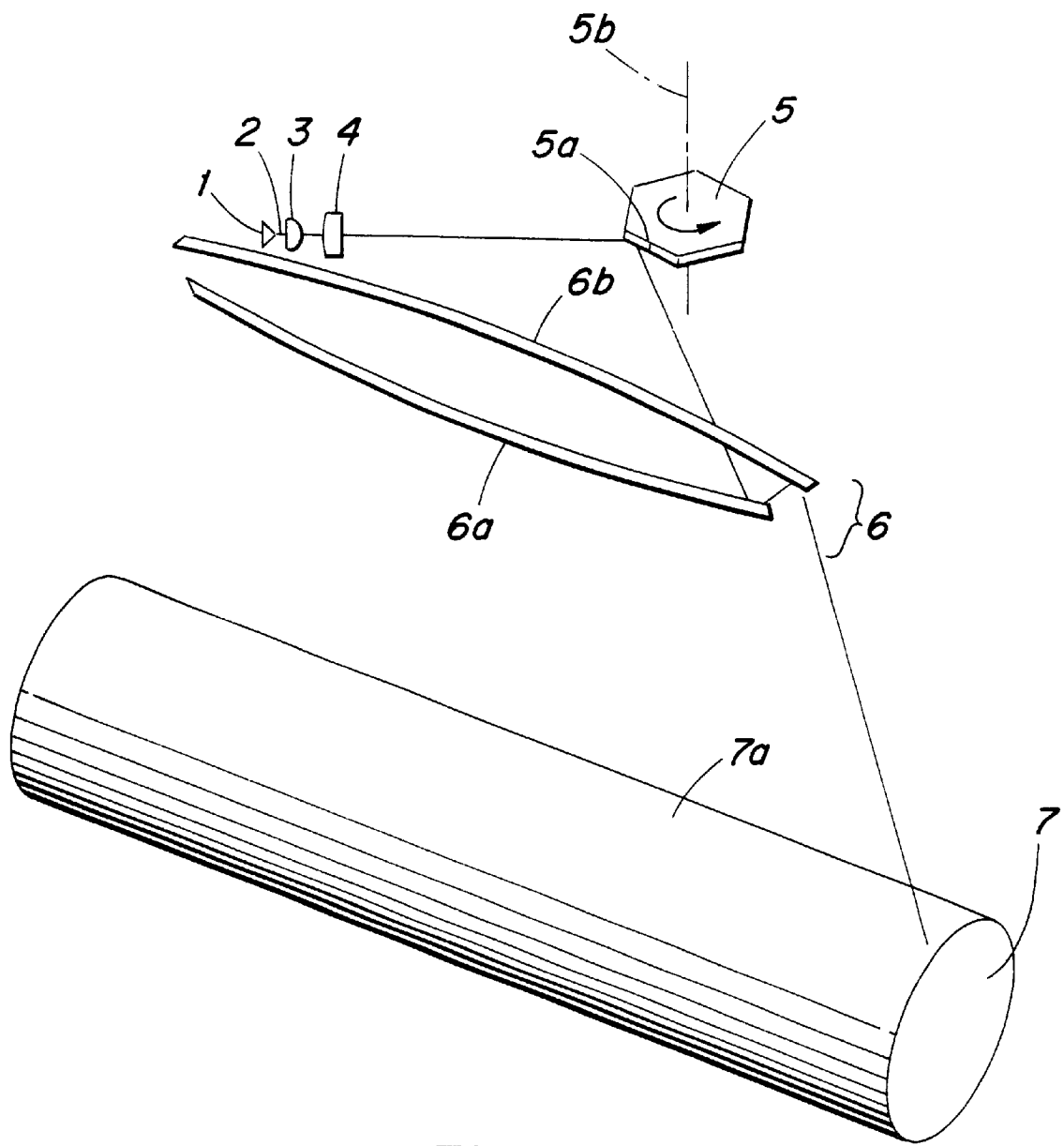
FIG. 1 is a perspective view showing a schematic structure of a first embodiment of the present invention FIGS. 2($a$) and 2($b$) are views showing the structure of a scanning optical system according to the first embodiment of the present invention.

Hereinafter, embodiments of the present invention will be described with reference to the drawings. FIG. 1 is a perspective view showing a schematic structure of a first embodiment of a laser scanning apparatus of the present invention. As shown in the figure, a laser beam 2 emanating from a laser light source 1 passes through a collimator lens 3 to be converted into a parallel beam, and then, passes through a cylinder lens 4 and is condensed only in the sub scanning direction in the vicinity of a reflecting surface 5$a$ of a polygon mirror 5.

Then, the laser beam 2 is deflected by the polygon mirror 5 rotating about the axis of rotation 5$b$ as shown by the arrow, is then reflected at a first mirror 6$a$ and a second mirror 6$b$ of a scanning mirror 6, and is condensed on an image surface 7$a$ on a cylindrical photosensitive body 7 to form a latent image. The rotation of the polygon mirror 5 rotates the reflecting surfaces 5$a$, so that the laser beam 2 scans the image surface 7$a$ on the rotating photosensitive body 7 to form a latent image.

Figure 2A:
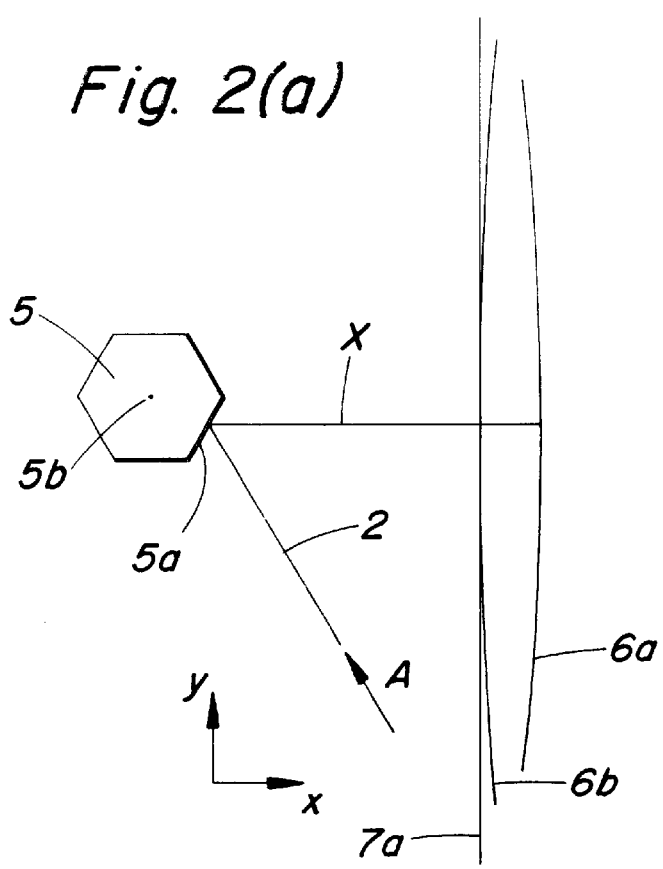
Figure 2B:
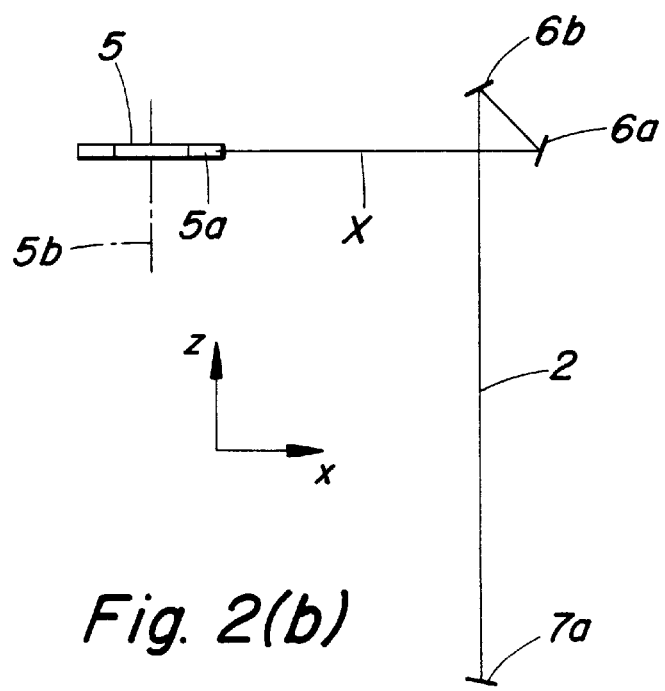

FIGS. 2($a$) and 2($b$) are views showing the structure of a scanning optical system according to the first embodiment of the present invention. FIG. 2($a$) is a plan view. FIG. 2($b$) is a side view. As shown in the figures, the optical axis X (reflected light from the polygon mirror 5 when the angle of deflection is 0; this applies in the following description) is on the x axis, a main scanning direction is the direction of the y axis, and the sub scanning direction is the direction of the z axis. Here, the laser beam 2 is incident on the reflecting surface 5$a$ of the polygon mirror 5 from a direction shown by the arrow A of FIG. 2($a$). The point where the reflecting surface 5$a$ and the optical axis X intersect is the origin. Table 1 shows the surface coordinates of the surfaces of the scanning optical system. In the table, the positions and orientations of the first mirror 6$a$, the second mirror 6$b$ and the image surface 7$a$ (evaluation surface) on the photosensitive body 7 are shown in the form of the origin, the x-axis, vector and the y-axis vector of the local coordinate system of the surfaces. The unit of the values associated with length is mm. The configurations of these surfaces are represented by the following expression:

$$x = \sum_{i=0}^{10} \sum_{j=0}^{3} a_{ij} y^i z^j.$$

Here, in the coordinate system, the optical axis is on the x axis, the main scanning direction is the direction of the y axis, and the sub scanning direction is the direction of the z axis as mentioned above. In the expression, the term in which z is raised to the first power represents an inclination in the vicinity of z=0 with respect to a cross-sectional configuration by a plane parallel to the x-z plane, and is used for expressing a configuration being asymmetrical in the sub scanning direction. Moreover, since the term in which z is raised to the first power takes the form of a polynomial of y, an appropriate inclination can be given to an arbitrary y by controlling the coefficients.

The configuration representing the inclination in the vicinity of z=0 and being asymmetrical in the sub scanning direction will be described in more detail. Generally, in a case where a surface is expressed as a function $x=f(y, z)$, when the angle between the x axis and a vector of projection of the normal to a tangent plane at a point $(y, z)=(y_0, z_0)$ on the surface onto the x-z plane is $\theta$, the value obtained by substituting $y=y_0$ and $z=z_0$ into f partially differentiated with respect to z equals $\tan \theta$. Therefore, expressing $\theta$ when z=0 as a function of y with respect to the mirror surfaces of the embodiment, $$\theta = \arctan \sum_{i=0}^{10} a_{i1} y^i.$$

At this time, if coefficients $a_{i1}$ are all zero except when i=0, $\theta$ is constant irrespective of the value of y. If there is at least one coefficient ail that is not zero when i is not less than 1 and not more than 10, $\theta$ changes as y changes. Here, that $\theta$ changes as y changes is referred to as that a surface has a twisted configuration. Therefore, in this specification, twisted configurations being used comply with this definition.

TABLE 1

|  |  | x-component | y-component | z-component |
|---|---|---|---|---|
| 1st mirror | Position | 105.18 | 0 | 0 |
|  | x-direction | 0.9239 | 0 | −0.3827 |
|  | y-direction | 0 | 1 | 0 |
| 2nd mirror | Position | 85.18 | 0 | 20 |
|  | x-direction | −0.3827 | 0 | 0.9239 |
|  | y-direction | 0 | 1 | 0 |
| Evolution | Position | 85.18 | 0 | −167.3 |
| Surface | x-direction | −0.1736 | 0 | −0.9848 |
|  | y-direction | 0 | 1 | 0 |

According to the first embodiment of the present invention, the two mirror surfaces each have a finite value where the coefficients $a_{i1}$ are not zero when i is not more than 1 and not less than 10. Therefore, the two mirror surfaces each have a twisted configuration.

In Tables 2 and 3, values of coefficients aij in which y is raised to the i-th power and z is raised to the j-th power in the above surface expression 1 are shown as matrices with i rows and j columns with respect to the mirror surfaces of the first mirror 6a and the second mirror 6b, respectively. In the tables, En (n is an integer) represents $\times 10^n$. For example, E-04 represents $\times 10^{31\ 4}$.

TABLE 2

| y/z | 0 | 1 | 2 |
|---|---|---|---|
| 0 | 0 | 0 | 5.7930006E-03 |
| 1 | 1.7585072E-03 | 1.9376347E-05 | −9.2982281E-07 |
| 2 | −7.2025615E-04 | 7.8637115E-06 | −8.6517925E-08 |
| 3 | −2.3426228E-07 | −1.1444293E-08 | 4.8174109E-11 |
| 4 | 1.5112943E-08 | 2.9953297E-10 | 1.4449148E-12 |
| 5 | 1.7069651E-11 | 1.1955511E-12 | −8.4552471E-15 |
| 6 | −6.9131564E-13 | −4.8237736E-14 | 2.7566167E-16 |
| 7 | −5.2882946E-16 | −6.4566469E-17 | 0 |
| 8 | 2.0981781E-17 | 2.9976838E-18 | 0 |
| 9 | 7.3088171E-21 | 1.4014273E-21 | 0 |
| 10 | −4.3978682E-22 | −6.5843384E-23 | 0 |

TABLE 3

| y[z] | 0 | 1 | 2 | 3 |
|---|---|---|---|---|
| 0 | 0 | 0 | −5.2597365E-03 | 1.8435728E-05 |
| 1 | 0 | 4.6557208E-06 | 2.7905216E-07 | −1.1401440E-09 |
| 2 | −6.6534281E-04 | 4.0850144E-06 | −5.1866305E-08 | 7.6113064E-10 |
| 3 | 1.8248434E-07 | −3.7431346E-09 | 4.1586051E-11 | −5.5400527E-13 |
| 4 | −8.1841951E-09 | 1.7996978E-10 | −2.6309496E-12 | 8.5466680E-15 |
| 5 | −1.0582078E-11 | 2.3747069E-13 | −2.0900791E-15 | −5.4837334E-17 |
| 6 | 3.5070660E-13 | −9.0327092E-15 | 8.4117737E-17 | 4.2493394E-18 |
| 7 | 2.2834265E-16 | −4.5177540E-18 | 7.2275337E-20 | 0 |
| 8 | −1.0994187E-17 | 2.6467607E-19 | −5.4917058E-21 | 0 |
| 9 | −2.0922272E-21 | −2.7998051E-23 | 6.9271904E-24 | 0 |
| 10 | 2.7269284E-22 | −1.4531582E-24 | −1.9777168E-25 | 0 |

Figure 3A:
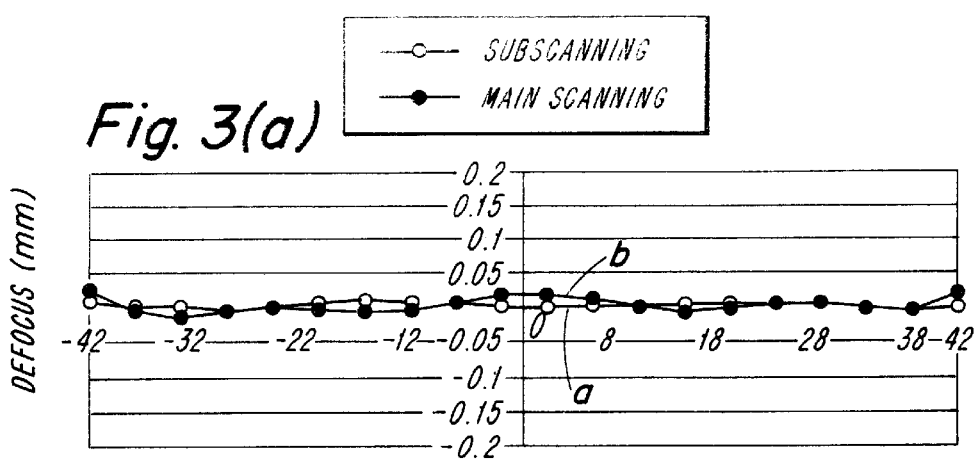
FIGS. 3($a$) to 3($d$) are views showing performances of the scanning optical system according to the first embodiment.
Figure 3B:
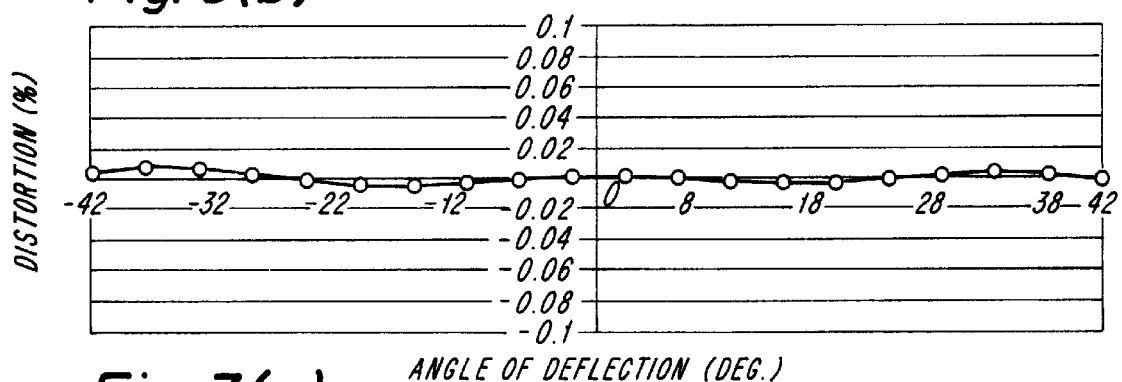
Figure 3C:
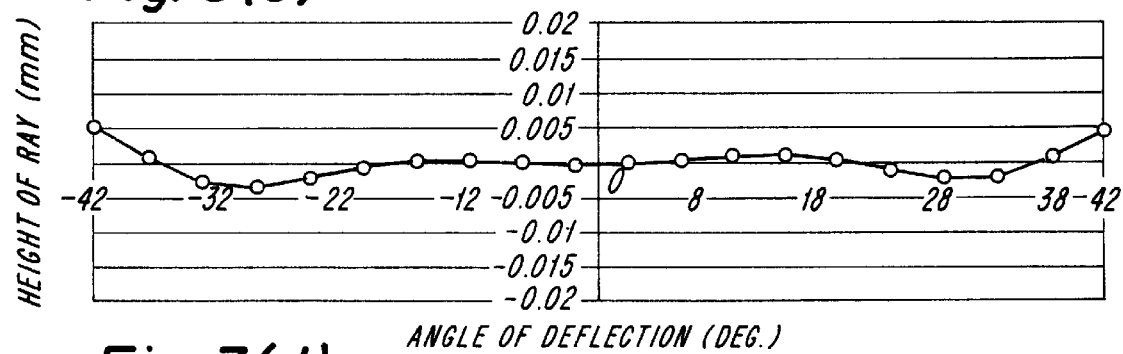
Figure 3D:
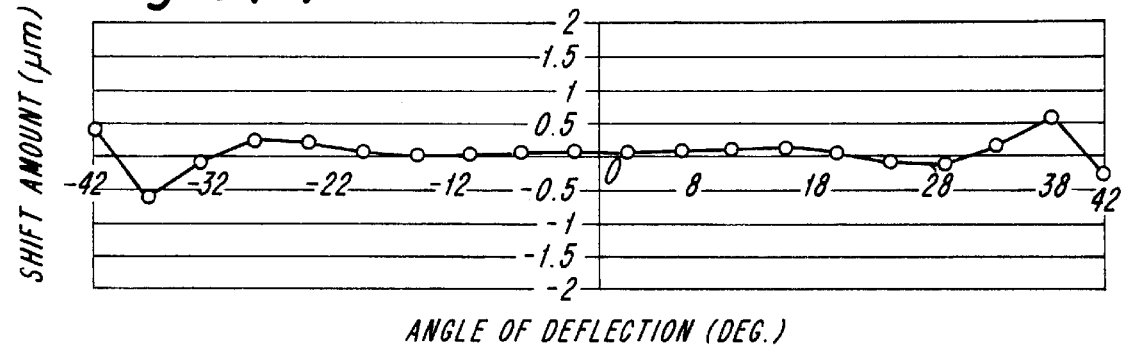

FIGS. 3(a) to 3(d) are views showing performances of the scanning optical system according to this embodiment. FIG. 3(a) shows curvatures of field. FIG. 3(b) shows distortion. FIG. 3(c) shows the height of a ray on the surface to be scanned. FIG. 3(d) shows the shift, in the main scanning direction, of a marginal ray in the sub scanning direction. In FIG. 3(a), the horizontal axis represents the angle of deflection (deg.), the vertical axis represents the defocus amount (mm), and curvatures of field in the sub scanning direction and in the main scanning direction are shown. The curvature of field in the sub scanning direction is represented by ♦ and the solid curved line a. The curvature of field in the main scanning direction is represented by ■ and the solid curved line b.

In FIG. 3(b), the horizontal axis represents the angle of deflection (deg.), the vertical axis represents distortion (%), and distortion is shown. In FIG. 3(c), the horizontal axis represents the angle of deflection (deg.), the vertical axis represents the height (mm) of the ray, and the height, in the sub scanning direction, of the ray on the surface to bescanned is shown. In FIG. 3(d), the horizontal axis represents the angle of deflection (deg.), the vertical axis represents the shift amount ($\mu$m), and the shift amount, in the main scanning direction, of the marginal ray in the subscanning direction is shown. It is apparent that in this embodiment, by the two mirror surfaces each having a twisted configuration, excellent characteristics are obtained in all of these performances.

From the fact that a condition in which the height, in the sub scanning direction, of the ray on the surface to be scanned is changed so as to be curved is called bow, bow correction condition is apparent from FIG. 3(c). The shift amount, in the main scanning direction, of the marginal ray in the sub scanning direction in FIG. 3(d) indicates that the ray on the upper end and the ray on the lower end within the pupil reach different positions on the image surface. When the shift amount is large, the imaging condition of the beam deteriorates, so that the problem of so-called out-of-shape beam arises.

Figure 4A:
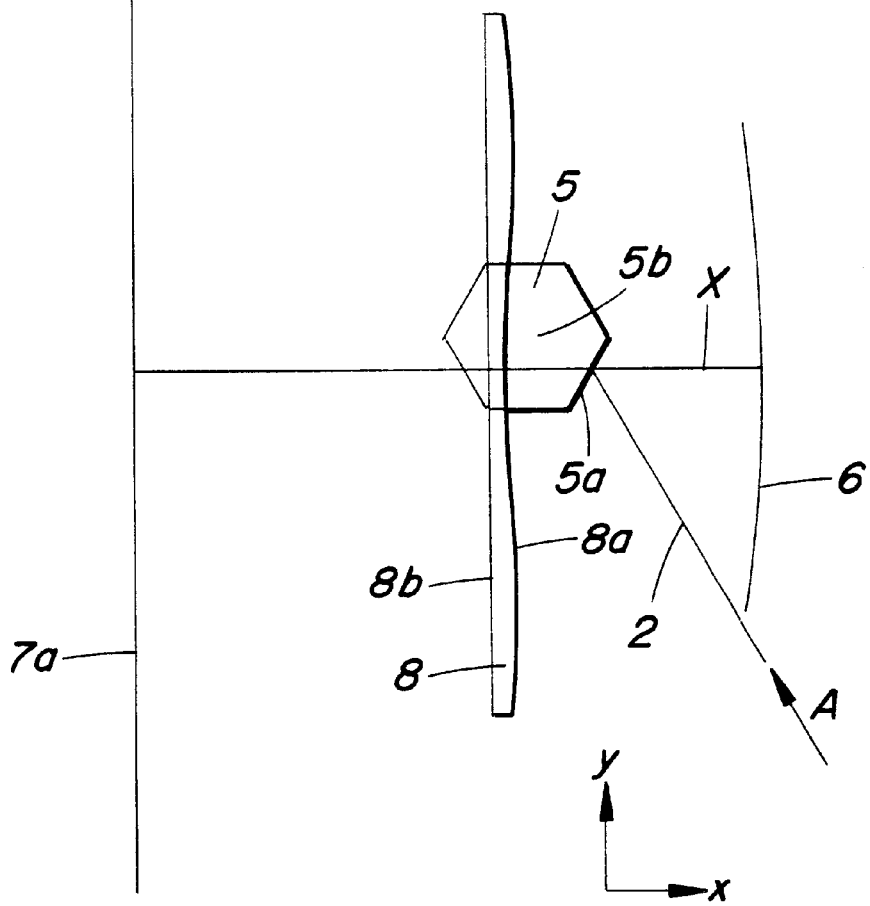
FIGS. 4($a$) and 4($b$) are views showing the structure of a scanning optical system according to a second embodiment of the present invention.
Figure 4B:
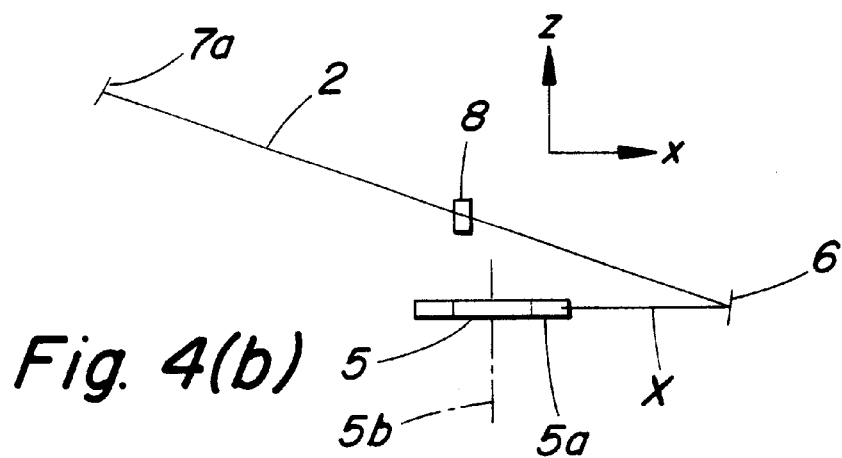

FIGS. 4(a) and 4(b) are views showing the structure of a scanning optical system according to a second embodiment of the present invention. FIG. 4(a) is a plan view. FIG. 4(b) is a side view. As shown in the figures, the optical axis X is on the x axis, the main scanning direction is the direction of the y axis, and the sub scanning direction is the direction of the z axis. Here, the laser beam 2 is incident on the reflecting surface 5a of the polygon mirror 5 from a direction shown by the arrow A of FIG. 4(a). The point where the reflecting surface 5a and the optical axis X intersect is the origin. In this embodiment, instead of two mirrors as described above, a scanning mirror 6 and a lens element 8 are used. The lens 8 has a free-form surface 8a and a plane 8b.

Table 4 shows the surface coordinates of the surfaces of the scanning optical system. In the table, the positions and orientations of the scanning mirror 6, the free-form surface 8a and the plane 8b of the lens 8 (refractive index n), and the image surface 7a (evaluation surface) on the photosensitive body 7 are shown in the form of the origin, the x-axis vector and the y-axis vector of the local coordinate system of the surfaces. The unit of the values associated with length is mm.

TABLE 4

|  |  | x-component | y-component | z-component |
|---|---|---|---|---|
| mirror | Position | 50 | 0 | 0 |
|  | x-direction | 0.9848 | 0 | -0.1736 |
|  | y-direction | 0 | 1 | 0 |
| lens | Position | -25.42 | 0 | 27.451 |
| (free shape) | x-direction | -1 | 0 | 0 |
| n = 1.51882 | y-direction | 0 | 1 | 0 |
| lens | Position | -30.42 | 0 | 27.451 |
| (plain surface) | x-direction | -1 | 0 | 0 |
|  | y-direction | 0 | 1 | 0 |
| Evolution | Position | -132.42 | 0 | 65.731 |
| Surface | x-direction | -0.8641 | 0 | 0.5033 |
|  | y-direction | 0 | 1 | 0 |

In Tables 5 and 6, values of coefficients aij in which y is raised to the i-th power and z is raised to the j-th power in the above surface expression 1 are shown as matrices with i rows and j columns with respect to the mirror surface of the scanning mirror 6 and the free-form surface 8a (lens surface) of the lens 8, respectively. In the tables, En (n is an integer) represents $\times 10^n$. For example, E-03 represents $\times 10^{-3}$.

TABLE 5

| y/z | 0 | 1 | 2 | 3 |
|---|---|---|---|---|
| 0 | 0 | 0 | -2.7478515E-03 | 8.7887034E-05 |
| 1 | 3.2844506E-03 | -7.4307105E-06 | -1.4494710E-06 | -1.6329010E-07 |
| 2 | -1.4320348E-03 | 3.3113815E-06 | 5.9655542E-07 | 2.4310991E-08 |
| 3 | -6.6003199E-07 | 1.8942744E-08 | 2.1031215E-09 | 5.1497601E-11 |
| 4 | 1.3835429E-07 | -3.1150585E-09 | -5.4539675E-10 | -7.0404825E-11 |
| 5 | 3.1917104E-10 | -1.2831392E-11 | -1.4327293E-12 | 1.2179974E-15 |
| 6 | -2.7224500E-11 | 1.0908245E-12 | 2.5479448E-13 | 2.5045957E-14 |
| 7 | -7.9630147E-14 | 4.1666450E-15 | 4.5541547E-16 | 0 |
| 8 | 5.2868427E-15 | -3.3379251E-16 | -1.3515453E-16 | 0 |
| 9 | 8.9005617E-18 | -5.9038004E-19 | -7.1799679E-20 | 0 |
| 10 | -8.2046111E-19 | 6.5674291E-20 | 3.4602697E-20 | 0 |

TABLE 6

| y/z | 0 | 1 | 2 |
|---|---|---|---|
| 0 |  |  | 1.1356484E-02 |
| 1 | 2.3661243E-03 | 2.5766269E-05 | -8.7447570E-07 |
| 2 | -1.2825996E-03 | -1.3439291E-05 | -2.1671471E-07 |
| 3 | -1.0085276E-06 | -1.7154363E-08 | 4.7181139E-12 |
| 4 | 2.1401860E-07 | 3.8041639E-09 | -1.9538117E-11 |
| 5 | 1.5136633E-10 | 3.6573868E-12 | 1.1717556E-15 |
| 6 | -1.5194322E-11 | -3.5479908E-13 | 2.6484209E-15 |
| 7 | -1.2158830E-14 | -3.6403959E-16 | -6.1066027E-19 |
| 8 | 8.3391294E-16 | 2.0709827E-17 | -2.1863723E-19 |
| 9 | 4.2991568E-19 | 1.4677332E-20 | 5.2030817E-23 |
| 10 | -2.6112857E-20 | -6.7895371E-22 | 1.0161679E-23 |

Figure 5A:
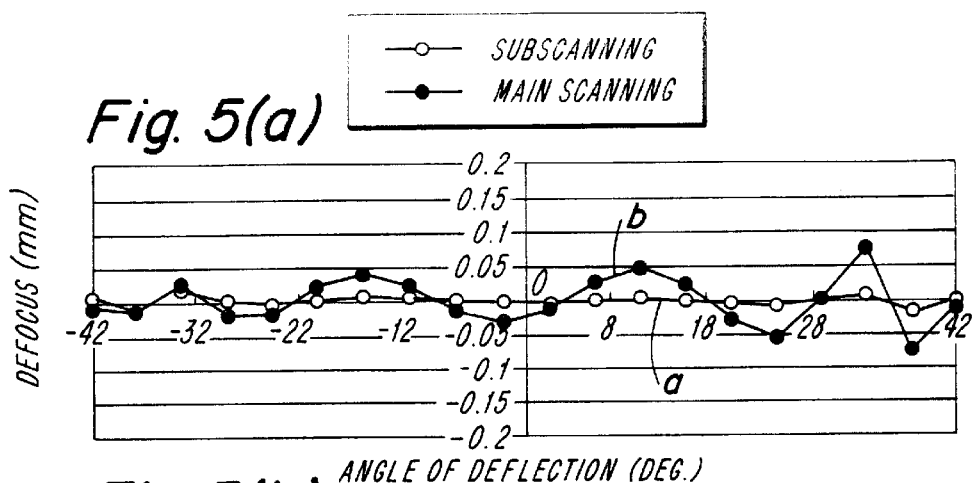
FIGS. 5($a$) to 5($d$) are views showing performances of the scanning optical system according to the second embodiment.
Figure 5B:
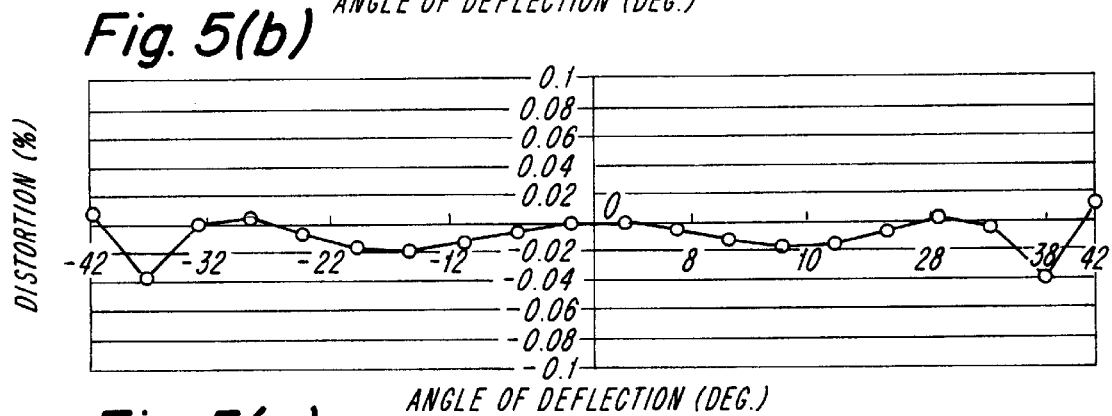
Figure 5C:
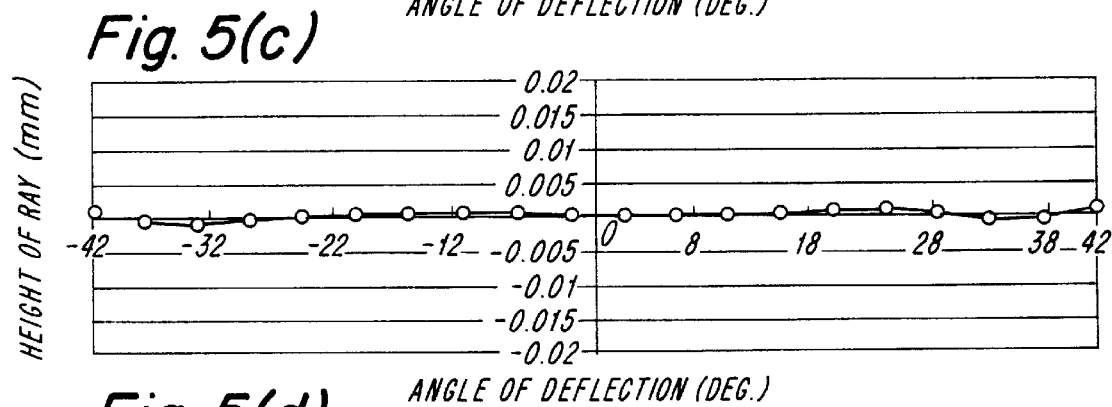
Figure 5D:
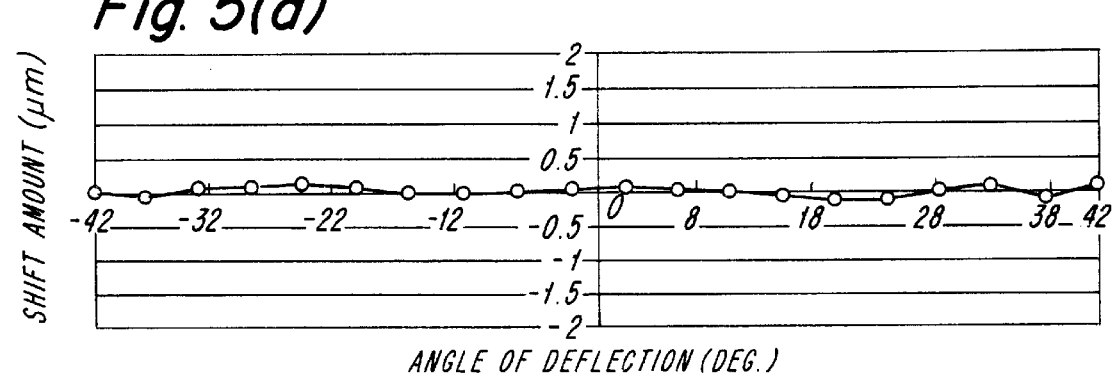

FIGS. 5(a) to 5(d) are views showing performances of the scanning optical system according to this embodiment. FIG. 5(a) shows curvatures of field. FIG. 5(b) shows distortion. FIG. 5(c) shows the height of a ray on the surface to be scanned. FIG. 5(d) shows the shift, in the main scanning direction, of a marginal ray in the sub scanning direction. In FIG. 5(a), the horizontal axis represents the angle of deflection (deg.), the vertical axis represents the defocus amount (mm), and curvatures of field in the sub scanning direction and in the main scanning direction are shown. The curvature of field in the sub scanning direction is represented by ♦ and the solid curved line a. The curvature of field in the main scanning direction is represented by ■ and the solid curved line b.

In FIG. 5(b), the horizontal axis represents the angle of deflection (deg.), the vertical axis represents distortion (%), and distortion is shown. In FIG. 5(c), the horizontal axis represents the angle of deflection (deg.), the vertical axis represents the height (mm) of the ray, and the height, in the sub scanning direction, of the ray on the surface to be scanned is shown. In FIG. 5(d), the horizontal axis represents the angle of deflection (deg.), the vertical axis represents the shift amount ($\mu$m), and the shift amount, in the main scanning direction, of the marginal ray in the sub scanning direction is shown. It is apparent that in this embodiment, by the mirror surface and the free-form surface of the lens each having a twisted configuration, excellent characteristics are obtained in all of these performances.

Figure 6A:
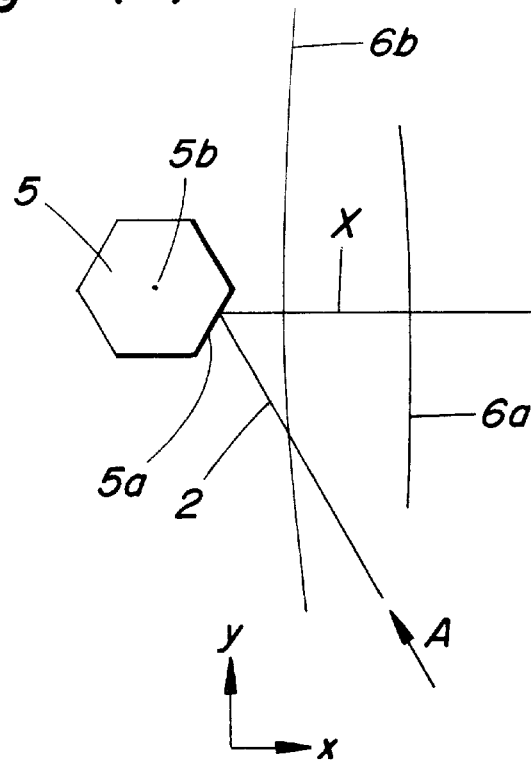
FIGS. 6($a$) to ($b$) are views showing the structure of a scanning optical system according to a third embodiment of the present invention.
Figure 6B:
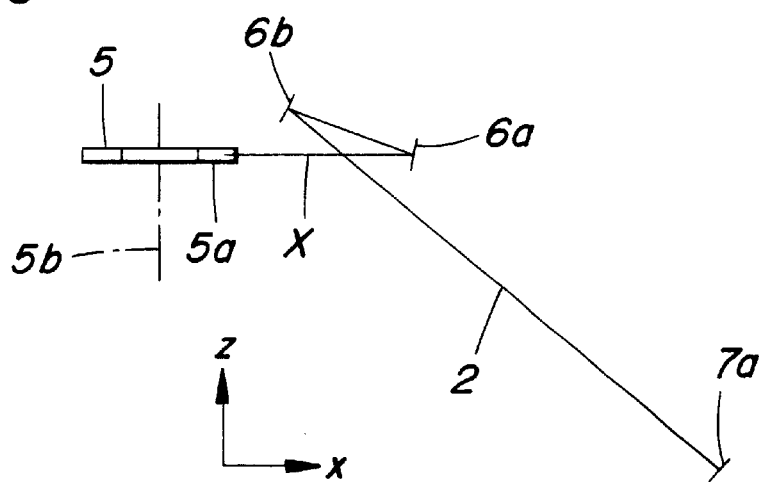

FIGS. 6(a) and 6(b) are views showing the structure of a scanning optical system according to a third embodiment of the present invention. FIG. 6(a) is a plan view. FIG. 6(b) is a side view. As shown in the figures, the optical axis X is on the x axis, the main scanning direction is the direction of the y axis, and the sub scanning direction is the direction of the z axis. Here, the laser beam 2 is incident on the reflecting surface 5a of the polygon mirror 5 from a direction shown by the arrow A of FIG. 6(a). The point where the reflecting surface 5a and the optical axis X intersect is the origin. Table 7 shows the surface coordinates of the surfaces of the scanning optical system. In the table, the positions and orientations of the first mirror 6a, the second mirror 6b and the image surface 7a (evaluation surface) on the photosensitive body 7 are shown in the form of the origin, the x-axis vector and the y-axis vector of the local coordinate system of the surfaces. The unit of the values associated with length is mm.

TABLE 7

|  |  | x-component | y-component | z-component |
|---|---|---|---|---|
| 1st mirror | Position | 60 | 0 | 0 |
|  | x-direction | 0.9848 | 0 | −0.1736 |
|  | y-direction | 0 | 1 | 0 |
| 2nd mirror | Position | 20 | 0 | 14.559 |
|  | x-direction | −0.866 | 0 | 0.5 |
|  | y-direction | 0 | 1 | 0 |
| Evolution | Position | 154.47 | 0 | −98.276 |
| Surface | x-direction | 0.6428 | 0 | −0.766 |
|  | y-direction | 0 | 1 | 0 |

In Tables 8 and 9, values of coefficients aij in which y is raised to the i-th power and z is raised to the j-th power in the above surface expression 1 are shown as matrices with i rows and j columns with respect to the mirror surfaces of the first mirror 6a and the second mirror 6b, respectively. In the tables, En (n is an integer) represents $\times 10^n$. For example, E-04 represents $\times 10^{-4}$.

TABLE 8

| y/z | 0 | 1 | 2 |
|---|---|---|---|
| 0 | 0 | 0 | 1.1749436E-02 |
| 1 | 1.4551712E-03 | −5.5645024E-08 | −4.9416272E-06 |
| 2 | −8.4647197E-04 | 4.2545323E-06 | −2.7424589E-07 |
| 3 | −6.1234167E-07 | −1.6663913E-08 | 1.2846968E-09 |
| 4 | 1.0282267E-07 | 2.0442410E-09 | −8.6619303E-11 |
| 5 | 1.6628644E-10 | 6.5401706E-12 | −1.7967436E-13 |
| 6 | −1.4682408E-11 | −2.9304039E-13 | 9.5607934E-15 |
| 7 | −1.9727172E-14 | −1.2044998E-15 | 0 |
| 8 | 1.8896042E-15 | −2.4199781E-18 | 0 |

TABLE 8-continued

| y/z | 0 | 1 | 2 |
|---|---|---|---|
| 9 | 7.4942283E-19 | 9.4428804E-20 | 0 |
| 10 | −1.3512133E-19 | 2.3398063E-21 | 0 |

TABLE 9

| y/z | 0 | 1 | 2 | 3 |
|---|---|---|---|---|
| 0 | 0 | 0 | −5.6320324E-03 | 6.6349916E-06 |
| 1 | 0 | −9.8886013E-07 | 2.9427123E-07 | −5.9118946E-09 |
| 2 | −4.5843537E-04 | 1.3791293E-06 | −2.6446584E-08 | 1.5136172E-09 |
| 3 | 2.8589356E-07 | −2.0166937E-09 | 4.7985474E-12 | 2.1423237E-12 |
| 4 | −4.3075641E-08 | 2.7774020E-10 | −7.2104330E-13 | −4.6732429E-13 |
| 5 | −3.4874299E-11 | 4.4720950E-13 | −3.5562996E-15 | −2.1972985E-16 |
| 6 | 3.2523975E-12 | −2.8093548E-14 | 3.5025372E-16 | 4.3162724E-17 |
| 7 | 1.6592319E-15 | −4.0393419E-17 | 6.3207386E-19 | 0 |
| 8 | −2.1027978E-16 | 2.3962405E-18 | −6.6991125E-20 | 0 |
| 9 | −1.5898246E-20 | 1.3901528E-21 | −3.3440869E-23 | 0 |
| 10 | 7.0185824E-21 | −1.0394891E-22 | 4.4504269E-24 | 0 |

FIGS. 7(a) to 7(d) are views showing performances of the scanning optical system according to this embodiment. FIG. 7(a) shows curvatures of field. FIG. 7(b) shows distortion. FIG. 7(c) shows the height of a ray on the surface to be scanned. FIG. 7(d) shows the shift, in the main scanning direction, of a marginal ray in the sub scanning direction. In FIG. 7(a), the horizontal axis represents the angle of deflection (deg.), the vertical axis represents the defocus amount (mm), and curvatures of field in the sub scanning direction and in the main scanning direction are shown. The curvature of field in the sub scanning direction is represented by ♦ and the solid curved line a. The curvature of field in the main scanning direction is represented by ■ and the solid curved line b.

In FIG. 7(b), the horizontal axis represents the angle of deflection (deg.), the vertical axis represents distortion (%), and distortion is shown. In FIG. 3(c), the horizontal axis represents the angle of deflection (deg.), the vertical axis represents the height (mm) of the ray, and the height, in the sub scanning direction, of the ray on the surface to be scanned is shown. In FIG. 3(d), the horizontal axis represents the angle of deflection (deg.), the vertical axis represents the shift amount ($\mu$m), and the shift amount, in the main scanning direction, of the marginal ray in the sub scanning direction is shown. It is apparent that in this embodiment, by the two mirror surfaces each having a twisted configuration, generally excellent characteristics are obtained in all of these performances. However, in the shift amount shown in FIG. 7(d), fluctuation is comparatively large.

Figure 8:
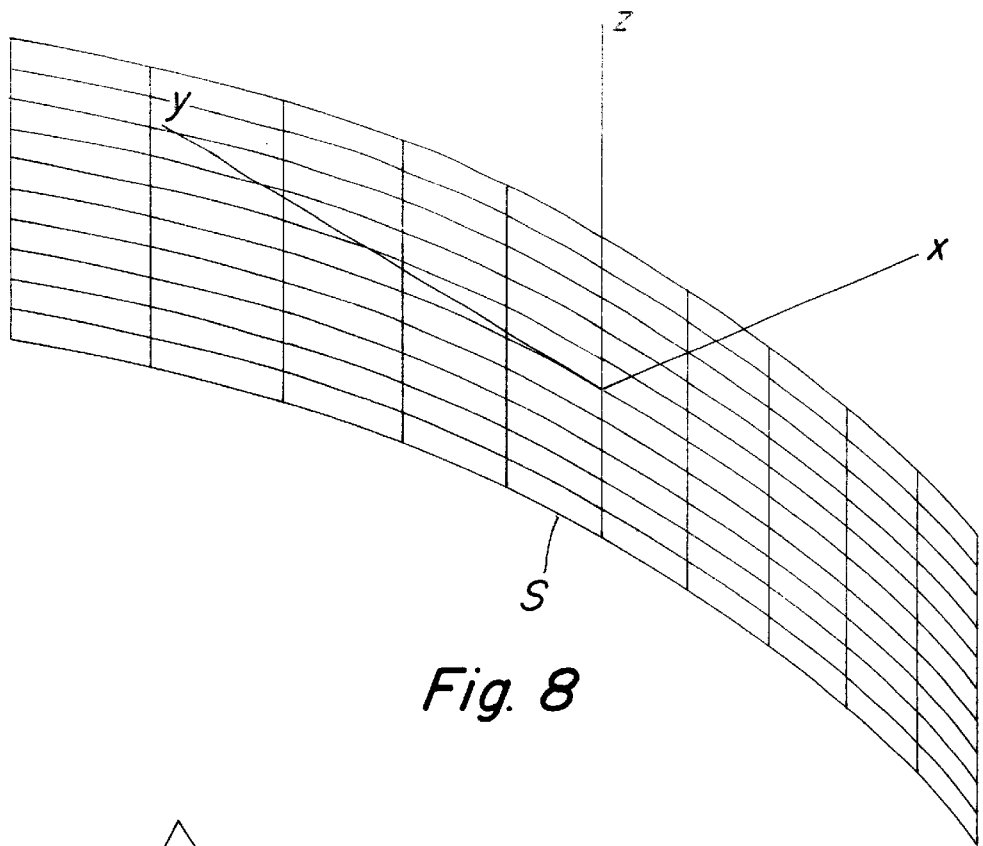
FIG. 8 is a perspective view schematically showing a mirror surface or a lens surface configuration the scanning optical system (z is raised to the 0-th power)

FIGS. 8 to 12 are perspective views schematically showing mirror surface and lens surface configurations of the scanning optical systems. In the figures, mirror surfaces and lens surface S having surface configurations represented by the expression 1 are shown in the form of meshes. FIG. 8 shows a surface configuration in which z is raised to the 0-th power. The cross section parallel to the x-z plane is a straight line along the z axis, and the straight line moves in the direction of the x axis along the y axis.

Figure 9:
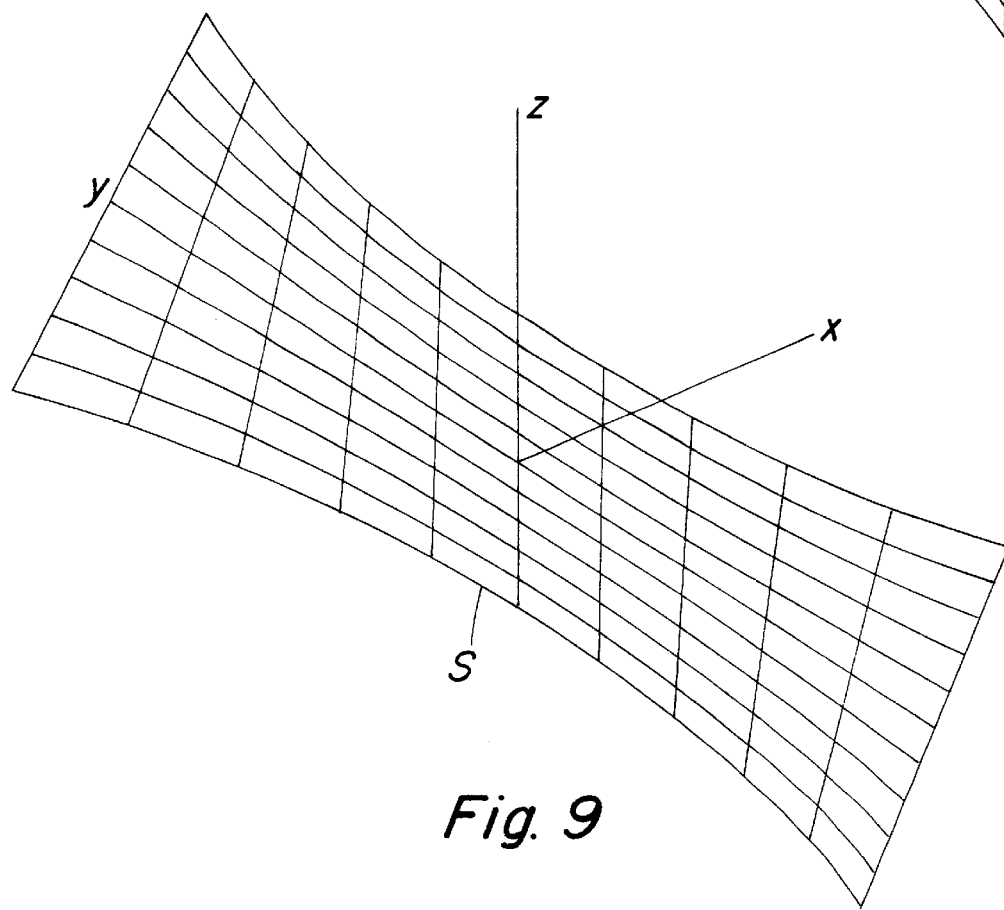
FIG. 9 is a perspective view schematically showing a mirror surface or a lens surface configuration of the scanning optical system (z is raised to the first power)
Figure 10:
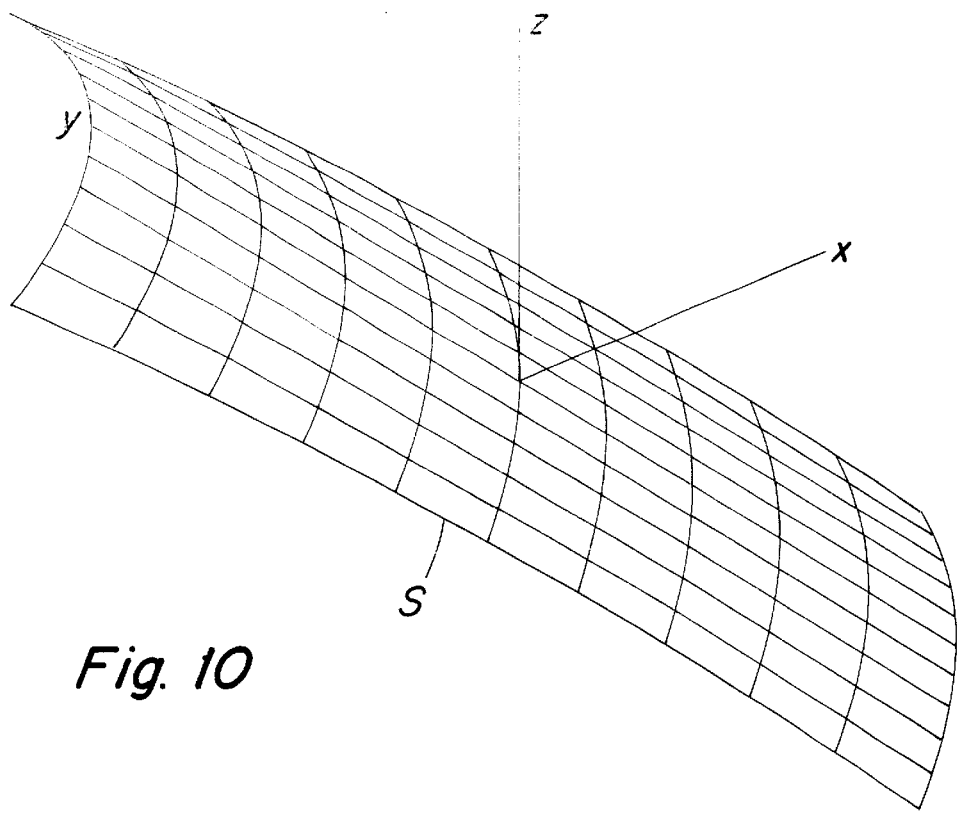
FIG. 10 is a perspective view schematically showing a mirror surface or a lens surface configuration of the scanning optical system (z is raised to the second power)

FIG. 9 shows a surface configuration in which z is raised to the first power. The cross section parallel to the x-z plane is a straight line, and the straight line rotates along the y axis to be twisted. FIG. 10 shows a surface configuration in which z is raised to the second power. The cross section parallel to the x-z plane is a quadratic curve, and the configuration of the quadratic curve changes along the y axis.

Figure 11:
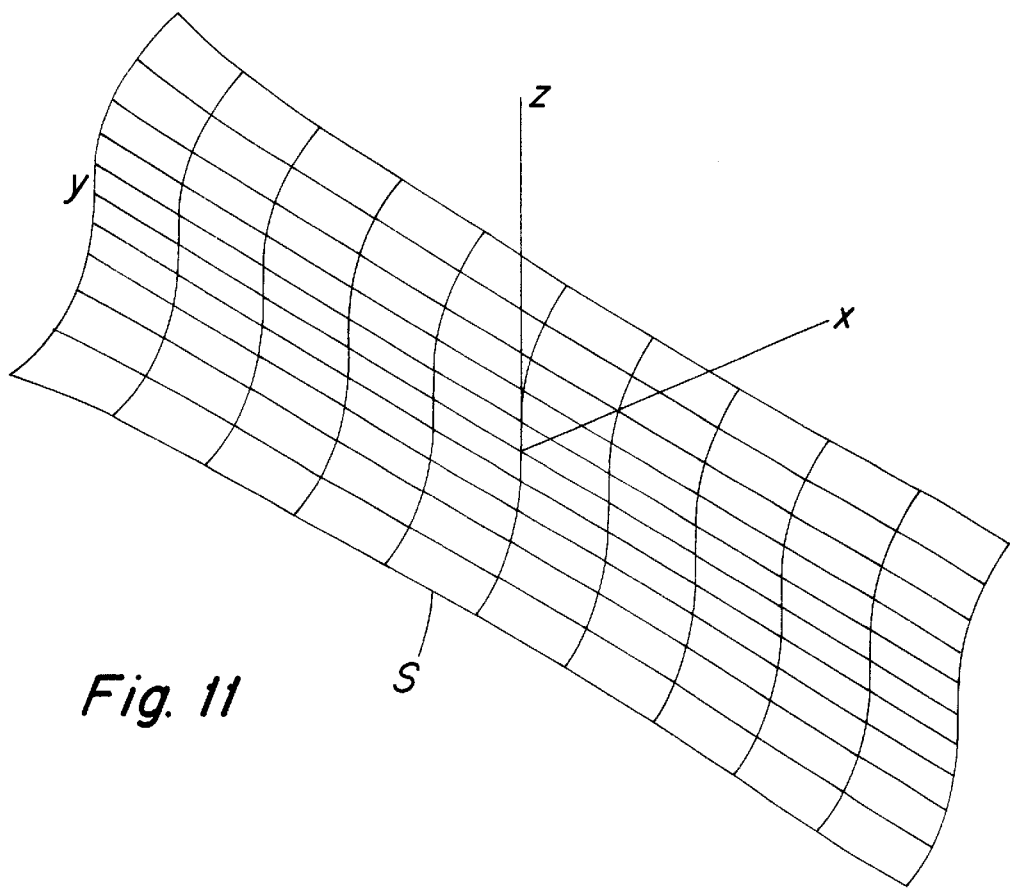
FIG. 11. is a perspective view schematically showing a mirror surface or a lens surface configuration of the scanning optical system (z is raised the third power)
Figure 12:
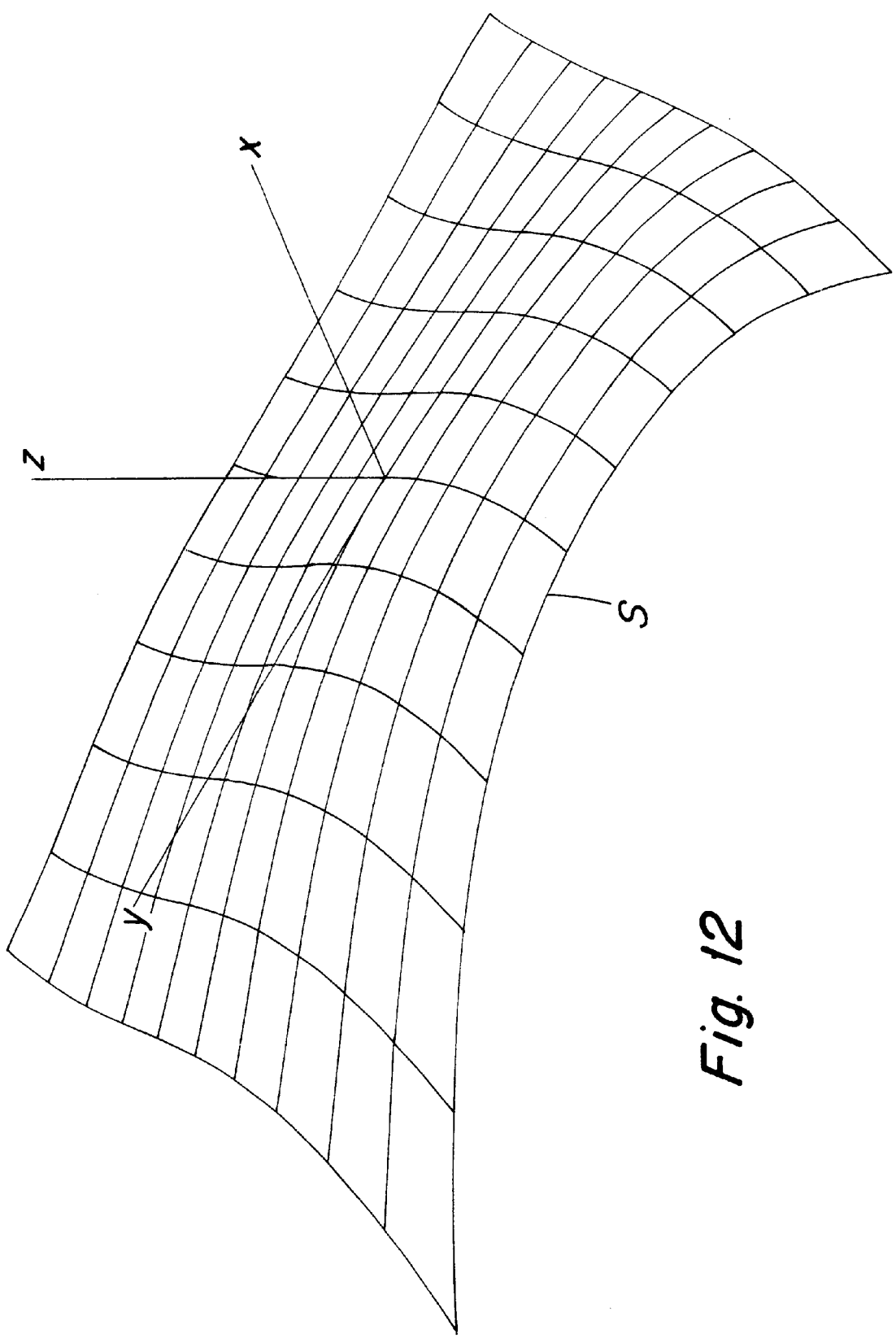
FIG. 12 is a perspective view schematically showing a mirror surface or a lens surface configuration of the scanning optical system (combination)

FIG. 11 shows a surface configuration in which z is raised to the third power. The cross section parallel to the x-z plane is a cubic curve, and the configuration of the cubic curve changes along the y axis. FIG. 12 shows a combination of the surface configurations in which z is raised to the 0-th to the third powers. As described above, the configurations of the mirror and lens surfaces are decided by selecting or combining various configurations in which z is raised to the powers and which are represented by polynomials of y.

Figure 13:
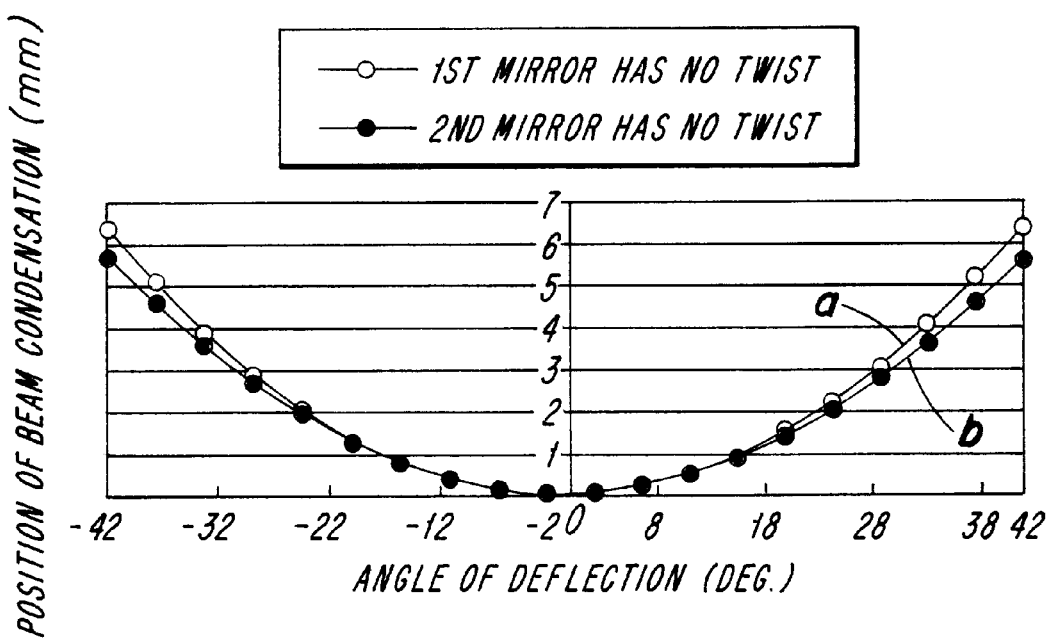
FIG. 13 is a view explaining a manner of occurrence of bow when there is no twist.

Now, a manner in which bow occurs when there is no twist will be described. FIG. 13 shows the position of beam condensation in the sub scanning direction in an example in which a scanning optical system of the present invention is re-designed, for example, so that one of the two mirror surfaces has no twist. In the figure, the horizontal axis represents the angle of deflection (deg.), and the vertical axis represents the sub scanning direction beam condensation position (mm). A case where the surface of the first mirror has no twist is represented by ♦ and the solid curved line a, and a case where the surface of the second mirror has no twist is represented by and the solid curved line b. It is apparent that as shown in the figure, only by one mirror surface having no twist, the sub scanning direction beam condensation position is largely curved to cause bow.

The light source as recited in claims corresponds to the laser light source in the embodiments; the deflector, to the polygon mirror; the surface to be scanned, to the image surface on the photosensitive body; the reflecting surface, to the first and the second mirrors; and the lens surface, to the free-form surface of the lens.

As described above, according to the laser scanning apparatus of the embodiments, by providing the scanning optical system with two surfaces each having a twist, the problems of bow and out-of-shape beam are resolved, so that a laser scanning apparatus having excellent imaging performance can be provided.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A scanning optical system that images a laser beam on a surface to be scanned, said laser beam being emitted from a light source and deflected by a deflector in order to scan the surface to be scanned, said scanning optical system comprising:

a first optical functional surface being a reflecting surface having a "twisted" configuration; and a second optical functional surface having a "twisted" configuration different from the "twisted" configuration of the first optical functional surface.

2. A scanning optical system as claimed in claim 1, wherein said second optical functional surface is also a reflecting surface.

3. A scanning optical system as claimed in claim 1, wherein said second optical functional surface is a refracting surface provided on a lens element.

4. A scanning optical system as claimed in claim 3, wherein said first optical functional surface is disposed closer to the light source than said second optical functional surface.

5. A scanning optical system that images a laser beam on a surface to be scanned, said laser beam being emitted from a light source and deflected by a deflector in order to scan the surface to be scanned, said scanning optical system comprising:

a first optical functional surface being a reflecting surface; and a second optical functional surface having a configuration being different from a configuration of said first optical functional surface, wherein when a direction of an optical axis of the laser beam is an x direction, a direction equivalent to a direction in which the laser beam scans the surface to be scanned by the deflector is a y direction, a direction orthogonal to both the x and y directions is a z direction and said first and second optical functional surfaces are expressed as local coordinates in which a center of scanning of the laser beam incident on said first and second optical functional surfaces is an origin, said first and second optical functional surfaces have configurations in which at least one of coefficients $a_{ij}$ has a finite value in the case where i=1 to 10 and j=1, said coefficients $a_{ij}$ being defined by the following expression:

$$x = \sum_{i=0}^{10} \sum_{j=0}^{3} a_{ij} Y^i z^j.$$

6. A scanning optical system as claimed in claim 5, wherein said second optical functional surface is also a reflecting surface.

7. A scanning optical system as claimed in claim 5, wherein said second optical functional surface is a refracting surface provided on a lens element.

8. A scanning optical system as claimed in claim 7, wherein said first optical functional surface is disposed closer to the light source than said second optical functional surface.

9. A scanning optical system that images a laser beam on a surface to be scanned, said laser beam being emitted from a light source and deflected by a deflector in order to scan the surface to be scanned, said scanning optical system comprising:

a first optical functional surface being a reflecting surface; and a second optical functional surface having a configuration different from a configuration of said first optical functional surface, wherein when a direction of an optical axis of the laser beam is an x direction, a direction equivalent to a direction in which the laser beam scans the surface to be scanned by the deflector is a y direction, a direction orthogonal to both the x and y directions is a z direction and said first and second optical functional surfaces are expressed as local coordinates in which a center of scanning of the laser beam incident on said first and second optical functional surfaces is an origin, said first and second optical functional surfaces have configurations in which an angle θ between the x direction and a vector of projection of a normal to a tangent plane where Z=0 onto an x-y plane changes as y changes.

10. A scanning optical system as claimed in claim 9, wherein said second optical functional surface is also a reflecting surface.

11. A scanning optical system as claimed in claim 9, wherein said second optical functional surface is a refracting surface provided on a lens element.

12. A scanning optical system as claimed in claim 11, wherein said first optical functional surface is disposed closer to the light source than said second optical functional surface.

13. A laser scanning apparatus comprising:

a light source that emits a laser beam;

a deflector that deflects the laser beam emitted from said light source, in order to scan a surface to be scanned;

a scanning optical system that images the laser beam deflected by said deflector on the surface to be scanned, said scanning optical system comprising: a first optical functional surface being a reflecting surface having a "twisted" configuration; and a second optical functional surface having a "twisted" configuration; and the surface to be scanned.

14. A laser scanning apparatus as claimed in claim 13, wherein said deflector is a polygon mirror, and an optical axis of the laser beam emitted from said light source forms a finite angle in a main scanning direction with respect to a reflecting surface of the polygon mirror.

* * * * *